United States Patent Office 3,275,672
Patented Sept. 27, 1966

3,275,672
PROCESS FOR PREPARING SULFONIC ACID ESTERS
Rudolf Kühne, Helmut Diery, and Bernhard Kiefer, Frankfurt am Main, Germany, assignors to Farbwerke Hoechst Aktiengesellschaft vormals Meister Lucius & Bruning, Frankfurt am Main, Germany, a corporation of Germany
No Drawing. Filed July 9, 1963, Ser. No. 293,865
Claims priority, application Germany, July 12, 1962, F 37,299
10 Claims. (Cl. 260—456)

It is known to prepare vinylsulfonic acid esters or their derivatives containing substituents in α- or β-position by reacting vinylsulfonic acid chloride or its substitution products with alcohols in the presence of agents binding hydrogen chloride.

It is also known to react β-chloroethane-sulfochloride substituted in α- or β-position with alcohols or phenols at pH-values below 8 in the presence of at least two equivalents of agents binding hydrogen chloride in organic solvents, whereby esters of sulfonic acids are obtained which possess a double linkage in α-β-position.

The object of the present invention is to provide a process for preparing ethionic acid esters or substituted ethionic acid esters and vinylsulfonic acid esters or substituted vinylsulfonic acid esters.

We have found that carbyl sulfate and also substituted carbyl sulfates can be reacted with aliphatic or cycloaliphatic monohydroxy compounds in a smooth reaction to yield the above-mentioned compounds. The first step of this reaction is illustrated by the following reaction scheme:

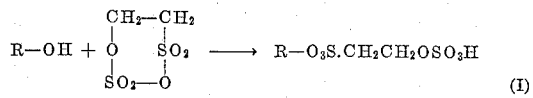

By alkalization of the ethionic acid esters (I), the corresponding vinylsulfonic acid esters can be obtained by separation of the sulfuric acid ester group according to the following reaction scheme:

$$RO_3S \cdot CH_2CH_2OSO_3H + 2NaOH \rightarrow$$
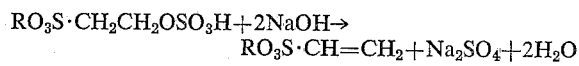

When using a substituted carbyl sulfate in the reaction instead of carbyl sulfate, there are obtained the corresponding substituted ethionic acid esters which, upon reaction with acid-binding agents, give the corresponding salts, or, upon alkalization, give the corresponding vinylsulfonic acid esters.

Furthermore, we have found that vinylsulfonic acid esters or substituted vinylsulfonic acid esters can also be directly obtained by direct reaction of aliphatic or cycloaliphatic hydroxy compounds with carbyl sulfate or substituted carbyl sulfates, in the presence of acid-binding agents. When preparing vinylsulfonic acid esters, it is not necessary to isolate the ethionic acid esters (I) or their salts, the reaction in the presence of acid-binding agents can rather be conducted in such a manner that the corresponding vinylsulfonic acid esters are obtained directly.

As monohydroxy compounds, there may be used primary, secondary, or tertiary aliphatic or cycloaliphatic straight chain or branched chain alcohols which, if desired, may also carry substituents which are inert towards carbyl sulfate under the reaction conditions used. As such substituents, there are mentioned by way of example: halogen atoms, and nitro, carboxyl or sulfonic acid groups. As hydroxy compounds, there are mentioned, for example, alkanols of up to 12 carbon atoms such as methanol, ethanol, n-propanol, iso-propanol, n-butanol, iso-butanols, decanol-1 and dodecanol-1, octadecanol-1, cyclohexanol, allyl alcohol, propargyl alcohol, mixed long chain alcohol derivatives of natural fats; furthermore, oxo-alcohols such as those obtained by the oxo-reaction with branched chain olefines, for example heptanol on the basis of dipropylene, nonyl-alcohol on the basis of di-iso-butylene, decyl-alcohol on the basis of tripropylene, tridecyl-alcohol on the basis of tetramerpropene or tri-iso-butylene. As substituted alcohols, there are mentioned chloroethyl alcohol, 1,3-dichloropropanol-2, 2,3-epoxy-propanol-1, glycolic acid, hydroxyethane-sulfonic acid, 2-hydroxypropane-sulfonic acid-1.

Aliphatic alcohols substituted by aromatic radicals, for example, benzyl alcohol or β-phenylethyl alcohol, may also be used.

The aliphatic hydroxy compounds which are suitable for the reaction may also be interrupted in their chain by hetero atoms which are inert towards the carbyl sulfate ring. As such, there are mentioned: glycol monomethyl ether, the products obtained by the reaction of alcohols, phenols, and carboxylic acids with ethylene oxide or propylene oxide, for example, hydroxy-ethylation products or hydroxypropylation products of methanol, butanol, dodecanol-1, tridecanol (product on the basis of tetrapropylene), stearyl alcohol, phenol, tri-iso-butylphenol, nonylphenol, dinonylphenol, acetic acid, coconut oil fatty acid, stearic acid, naphthenic acid.

For the reaction with the aliphatic hydroxy compounds, there may be used carbyl sulfate as well as its substitution products. As examples, there are mentioned: methyl-carbyl sulfate, dimethyl-carbyl sulfate (from butene-2), n-butyl-carbyl sulfate, n-decyl-carbyl sulfate, chloromethyl-carbyl sulfate, bromo-methyl-carbyl sulfate, p-nitrophenyl-carbyl sulfate, p-chloro-phenyl-carbyl sulfate.

These compounds are prepared according to known methods from the corresponding ethylenically unsaturated compounds and sulfur trioxide. Thus, methyl-carbyl sulfate can be prepared by introducing propylene into a solution of liquid sulfur trioxide in liquid sulfur dioxide at a temperature in the range of −15° C. to −20° C. After separation of the sulfur dioxide by distillation, methyl-carbyl sulfate remains behind in the form of a solid residue which can be recrystallized from ethylene chloride.

If freshly distilled allyl chloride is introduced instead of propylene, there is obtained after separation of the sulfur dioxide by distillation chloromethyl-carbyl sulfate which can be obtained in a pure state in the form of a fine crystal powder by recrystallization under strong cooling from a small amount of ethylene chloride.

Analogously, when using allyl bromide, there is obtained bromomethyl-carbyl sulfate. The compound is likewise recrystallizable from ethylene chloride.

The reaction of aliphatic, araliphatic or cycloaliphatic hydroxy compounds with carbyl sulfate can be effected in an inert organic solvents in such a manner that first the ethionic acid ester (I) is prepared. The use of substituted carbyl sulfates results in the formation of corresponding substituted ethionic acid esters. As inert organic solvents, there are preferably used chlorinated low molecular aliphatic hydrocarbons or solvents that have a high dipolar moment. Examples thereof are: methylene chloride, ethylene chloride, perchloroethylene, methyl chloroform, dichlorobenzene, acetonitrile, nitrobenzene, and similar compounds. The carbyl sulfate or the substituted carbyl sulfates may be added to the solution of the hydroxy compound in the organic solvent either in solid or in dissolved state; however, also the reverse order is possible.

The ethionic acid esters or the substituted ethionic acid esters are converted into the corresponding salts by a treatment with acid-binding agents, advantageously in the presence of water. The salt form of the mentioned esters can be obtained up to a pH-value of about 8 to 9. When adjusting a higher pH-value with the aid of the acid-binding agents, there are obtained, under separation of the sulfuric acid radicals, the corresponding vinylsulfonic acid esters. Although the limit up to which salts of ethionic acid esters are obtained is generally at a pH-value in the range from about 8 to 9, the pH-value depends on the reaction components reacted with one another and on the reaction conditions, for example, the temperature and time of stay; therefore, shifts upward or downward are quite possible.

As acid-binding agents, there are mentioned by way of example: alkali metal hydroxides such as sodium or potassium hydroxide, alkali metal carbonates and bicarbonates such as sodium carbonate, sodium bicarbonate, potassium carbonate, and potassium bicarbonate, alkali metal phosphates such as sodium phosphate, alkali metal silicates, alkali metal acetates, alkaline earth metal hydroxides such as magnesium hydroxide, calcium hydroxide, alkaline earth metal bicarbonates and similar compounds.

In view of the great sensitivity of the carbyl sulfate and of its substitution products to moisture it is very surprising that the process of the present invention, i.e. the reaction of aliphatic hydroxy compounds with carbyl sulfate or with substituted carbyl sulfates can also be carried out in the presence of water, since it is well known that carbyl sulfate is converted into ethionic acid by the action of water. It was not foreseeable that the alcoholysis takes place with such good yield despite the possibility of hydrolysis, so that, depending on the pH-value chosen, there can be obtained either ethionic acid esters or substituted ethionic acid esters or vinylsulfonic acid esters or substituted vinylsulfonic acid esters. A preferred method of operation is that using a two-phase system, in which an inert solvent, for example an aliphatic or aromatic hydrocarbon, a halogenated hydrocarbon such as methylene chloride or ethylene chloride, an ether such as diethyl ether, or a ketone such as methyl ethyl ketone, is used in addition to the aqueous phase.

The acid-binding agents used may be added either in solid form, in aqueous solution or suspension before the reaction or in proportions suitable for maintaining the desired pH-value during the reaction. When carrying out the reaction in the presence of water, the carbyl sulfate or the substituted carbyl sulfates are added as such or in dissolved state.

However, one may also directly lead the reaction towards the vinylsulfonic acid esters or substituted vinylsulfonic acid esters by maintaining the pH-value above 9 by the presence of acid-binding agents. In that case, the aliphatic hydroxy compound to be reacted is introduced first into a two-phase system, for example, ethylene chloride and water, an acid-binding agent having a pH-value of more than 9 is added, and the carbyl sulfate or the substituted carbyl sulfate is the introduced into this mixture, while stirring vigourously. The vinylsulfonic acid ester or the substituted vinylsulfonic acid ester can then be isolated from the organic phase. However, one may also carry out the reaction in water alone and in the absence of an inert organic solvent and after the reaction isolate the reaction product by extraction. However, the yields obtained when operating according to this method are usually smaller. The reaction of carbyl sulfate or of substituted carbyl sulfates with aliphatic hydroxy compounds may also be carried out in the absence of any solvent. In that case, carbyl sulfate or the substituted carbyl sulfate is introduced in small amounts into a molar quantity of the aliphatic hydroxy compound. The reaction mixture obtained is then worked up in the usual manner.

The reaction temperatures of the process range preferably from —5° C. to +30° C.; however, for special purposes, it may be of advantage to carry out the reaction at higher temperatures, provided the stability of the carbyl sulfate or of the substituted carbyl sulfates or of the reaction products formed permits the use of such higher temperatures.

Ethionic acid esters, ethionic acid esters in salt form or vinylsulfonic acid esters which may also be substituted, are valuable products for the preparation of textile auxiliaries, plastics, dyestuffs pest control agents, etc.

The following examples illustrate the invention, but they are not intended to limit it thereto, the parts indicated being by weight.

*Example 1*

1,000 parts of ethylene chloride, 240 parts of water 108 parts of n-propanol and 88.8 parts of calcium hydroxide were introduced into a reaction vessel. 112.8 parts of carbyl sulfate were then added, while stirring vigourously, and within one hour, while maintaining the temperature in the range of 8° C. and 15° C. After a further stirring for 1 hour, the whole was filtered with suction, the ethylene chloride layer was separated, dried with sodium sulfate and separated from the drying agent. The ethylene chloride was separated by distillation, finally, in a full water-jet vacuum, whereby vinylsulfonic acid-n-propyl ester was obtained in the form of a liquid residue in a yield of 70 to 75% (referred to carbyl sulfate). Boiling point at a pressure of 8 mm. Hg=94° C. to 98° C., $n_D^{20}$ =1.4361 (distilled).

*Example 2*

285 parts of ethylene chloride, 80 parts of water, 18 parts of n-propanol and 63.1 parts of barium hydroxide. 8H$_2$O were first introduced into a reaction vessel. 18.8 parts of carbyl sulfate were then added, while stirring vigourously, during the course of 30 minutes and at a temperature in the range from 10° C. to 15° C. After a further stirring for ½ hour, the whole was weakly acidified with acetic acid, filtered with suction, and the ethylene chloride layer was washed with a small amount of water. After drying with sodium sulfate, the reaction product was worked up as described in Example 1. The yield of vinylsulfonic acid-n-propyl ester amounted to about 40% of the theoretical yield (referred to the carbyl sulfate used).

When using 52.9 parts of strontium hydroxide·8H$_2$O instead of barium hydroxide, there was obtained vinylsulfonic acid-n-propyl ester in a yield of 67% of the theoretical yield.

When carrying out the reaction in the presence of 31.8 parts of sodium carbonate instead of barium hydroxide, vinyl-sulfonic acid -n-propyl ester could be isolated in an amount of 60%.

*Example 3*

(a) 18.8 parts of carbyl sulfate were added within 30 minutes, while stirring vigourously and at 10° C., to a mixture of 315 parts of ethylene chloride, 80 parts of water, 22.2 parts of n-butanol and 14.8 parts of calcium hydroxide. After filtration with suction, separation of the ethylene chloride layer and separation of the solvent, vinylsulfonic acid-n-butyl ester was obtained in a yield of 67% of the theoretical yield (referred to carbyl sulfate). Boiling point at a pressure of 9 mm. Hg=107° C. to 108.5° C.; $n_D^{20}$=1.4392 (distilled).

(b) 75 parts of n-butanol were added dropwise at a temperature ranging from —5° C. to 0° C. to a mixture of 1,250 parts of ethylene chloride and 208 parts of carbyl sulfate. After 2 hours' stirring at about 20° C., the solution was dropped into a suspension of 1,000 parts of water, 300 parts of calcium hydroxide and 2,500 parts of ethylene chloride. After a further stirring for 1 to 2 hours, the whole was filtered with suction and the residue was washed twice with a small amount of ethylene chloride. The separated ethylene chloride layer was shaken with 200 parts of 1N-sodium carbonate solution, washed with water until free from sulfate and until neutral, dried with calcium chloride and concentrated under reduced pressure.

As residue, there remained behind vinylsulfonic acid-n-butyl ester in a yield of 60% (referred to the n-butanol used.)

Example 4

75 parts of n-butanol were dropped at 0° C. into a mixture of 750 parts of ethylene chloride and 208 parts of carbyl sulfate. After 2 hours' stirring at room temperature, the content of the flask was allowed to drop into a solution of 170 parts of potassium bicarbonate in 400 parts of water. After a further 2 hours stirring at 10° C., to 15° C., the precipitated potassium salt of ethionic acid-n-butyl ester could be isolated by suction-filtration in a yield of 36%. Further amounts were found in the aqueous phase. The compound was found to be recrystallizable from methanol. The pure substance was found to melt at 173° C.

Example 5

138 parts of ethyl alcohol were added dropwise at a temperature ranging from 20° to 25° C. to a mixture of 680 parts of commercial carbyl sulfate and 1,250 parts of ethylene chloride. After a 2 hour stirring at 20° C., the content of the flask was allowed to drop into a suspension of 2,000 parts of water, 900 parts of calcium hydroxide and 2,500 parts of ethylene chloride at a temperature from 15° to 20° C. Stirring was then continued for 2 hours and the reaction product was worked up as described in Example 3(b). The vinylsulfonic acid ethyl ester was obtained in a yield of 48% (referred to the ethyl alcohol used). Boiling point at a pressure of 10 mm. Hg=89° C.; $n_D^{20}=1.4325$ (distilled).

Example 6

372 parts of molten n-dodecanol were dropped, at a temperature from 25° to 30° C., into an elution of 490 parts of commercial carbyl sulfate in 1,700 parts of ethylene chloride. After a 3 hour stirring at 15° to 20° C., the content of the flask was stirred at 10° to 20° C. into a suspension of 2,000 parts of water, 00 parts of calcium hydroxide and 2,500 parts of ethylene chloride. The reaction product was then worked up in the manner described in Example 3(b). The vinylsulfonic acid n-dodecyl ester was obtained in a yield of 50% (referred to the n-dodecanol used). Boiling point at a pressure of 0.2 mm. Hg=149° to 151° C. (with partial decomposition); $n_D^{20}=1.4532$ (distilled).

Example 7

187 parts of n-dodecanol were allowed to drop into an elution of 208 parts of carbyl sulfate in 1,250 parts of ethylene chloride. After 2 hours' stirring at 10° to 20° C., the content of the flask was dropped at about 15° C. into a solution of 210 parts of potassium bicarbonate in 700 parts of water. After half an hour the precipitated potassium salt of ethionic acid-n-dodecyl ester was suction-filtered and dried. The yield was somewhat more than 80% of the theoretical yield (referred to n-dodecanol). The compound was found to be recrystallizable from a great amount of methanol.

Example 8

161 parts of 2-chloroethanol were allowed to drop into a mixture of 1,500 parts of ethylene chloride and 450 parts of commercial carbyl sulfate, at a temperature in the range of 15° and 20° C. After 3 hours' stirring at 10° to 20° C., the content of the flask was introduced dropwise, at a temperature in the range of 10° to 20° C. into a suspension of 1,000 parts of water, 600 parts of calcium hydroxide and 1,900 parts of ethylene chloride. Stirring was continued for 1 hour and the reaction product was worked up as described in Example 3(b). The yield of vinylsulfonic acid-β-chloroethyl ester was 59% (referred to the 2-chloroethanol used). Boiling point at a pressure of 0.2 mm. Hg=81.5° to 83° C.; $n_D^{20}=1.4669$ (distilled).

Example 9

315 parts of ethylene chloride, 40 parts of water, 18 parts of n-propanol and 14.8 parts of calcium hydroxide were introduced into a reaction vessel. 20.2 parts of methyl-carbyl sulfate (prepared from propene and sulfur trioxide) were then introduced, while stirring vigorously, in the course of 35 minutes at a temperature in the range of 10° to 15° C. Stirring was then continued for 20 minutes, the whole was suction-filtered, the ethylene chloride layer was separated and dried with sodium sulfate. After separation of the filtered ethylene chloride by distillation, finally under a water jet vacuum, propane-1-sulfonic acid-1-n-propyl ester remained behind in a yield of 55% (referred to the methyl-carbyl sulfate used) in the form of a liquid residue. Boiling point at a pressure of 7 mm. Hg=112° to 115° C.; $n_D^{20}=1.44880$ (distilled).

Example 10

28.1 parts of bromomethyl-carbyl sulfate (prepared from allyl bromide and liquid sulfur trioxide) were introduced at a temperature in the range from 10° to 12° C. into a vigourously stirred mixture of 315 parts of ethylene chloride, 40 parts of water, 18 parts of n-propanol and 14.8 parts of calcium hydroxide. The whole was then suction-filtered, the ethylene chloride layer was dried over sodium sulfate and concentrated. As a residue, there remained behind in a yield of 72% (referred to the bromomethyl-carbyl sulfate) liquid bromo-methyl-vinylsulfonic acid-n-propyl ester. Boiling point at a pressure of 0.15 mm. Hg=110° to 123° C.; $n_D^{20}=1.495$ (distilled).

When using 23.6 parts of chloromethyl-carbylsulfate (prepared from allyl chloride and sulfur trioxide) instead of bromomethyl-carbyl sulfate, there was obtained liquid chloromethylvinylsulfonic acid-n-propyl ester in a yield of 68%. Boiling point at a pressure of 0.1 mm. Hg=108° to 115° C.; $n_D^{20}=1.4715$ (distilled).

The chloromethyl-vinylsulfonic acid methyl ester formed when operating according to the same method, was obtained in a yield of 41%.

Example 11

94 parts of carbyl sulfate were introduced, while cooling, in small amounts into 38 parts of n-butanol. The temperature was kept at 10° to 20° C. and after the addition was terminated, stirring was continued for 2 hours without cooling, whereupon the temperature slowly rose to about 30° C. The reaction mixture was then introduced at a temperature ranging from 10° C. to 20° C. into a suspension of 500 parts of water, 150 parts of calcium hydroxide and 1,250 parts of ethylene chloride, and stirring was then continued for 1 hour. The reaction product was then worked up as described in Example 3(b). The vinylsulfonic acid-n-butyl-ester was obtained in a crude yield of more than 50%.

We claim:

1. A process for preparing a vinyl sulfonic acid ester which comprises reacting carbyl sulfate, methyl carbyl sulfate, bromomethyl carbyl sulfate or chloromethyl carbyl sulfate with a monohydroxy alkanol of up to 12 carbon atoms at a pH-value greater than 9.

2. A process as defined in claim 1 wherein the reaction is conducted in the presence of an acid-binding agent.

3. A process as defined in claim 2 wherein said acid-binding agent is an alkali metal hydroxide, carbonate, phosphate, silicate or acetate or an alkaline earth metal hydroxide or carbonate.

4. A process as defined in claim 2 wherein said acid-binding agent is an alkali metal hydroxide.

5. A process as defined in claim 1 wherein the reaction is conducted in an inert organic solvent.

6. A process as defined in claim 5 wherein said inert solvent contains water.

7. A process as defined in claim 5 wherein said solvent is methylene chloride, ethylene chloride, perchloroethylene, methyl chloroform, dichlorobenzene, acetonitrile or nitrobenzene.

8. A process as defined in claim 1 wherein said reaction is conducted at a temperature ranging from −5° C. to a temperature below the decomposition temperature of the particular carbyl sulfate used.

9. A process as defined in claim 8 wherein said reaction is conducted at a temperature ranging from −5° C. to about +30° C.

10. A process as defined in claim 1 wherein carbyl sulfate is reacted with said alkanol.

References Cited by the Examiner
UNITED STATES PATENTS

| | | | |
|---|---|---|---|
| 2,666,788 | 1/1954 | Ebel | 260—457 |
| 3,133,948 | 5/1964 | Distler | 260—456 |
| 3,158,639 | 11/1964 | Klass et al. | 260—456 |

OTHER REFERENCES

Gilbert et al., Ind. and Eng. Chem., vol. 43, pp. 2022–2024 (1951).

CHARLES B. PARKER, *Primary Examiner.*

F. D. HIGEL, *Assistant Examiner.*